United States Patent

[11] 3,603,919

| [72] | Inventor | Richard K. Moore |
| | | Lawrence, Kans. |
| [21] | Appl. No. | 802,851 |
| [22] | Filed | Feb. 27, 1969 |
| [45] | Patented | Sept. 7, 1971 |
| [73] | Assignee | The Kansas University Endowment Association |
| | | Lawrence, Kans. |

[54] POLY-PANCHROMATIC TARGET IDENTIFICATION
10 Claims, 9 Drawing Figs.

[52] U.S. Cl. ................................................... 340/1 R,
340/3 R, 340/3 C, 340/3 FM, 343/5 CD, 343/17.2
[51] Int. Cl. ........................................................ G01s 9/66
[50] Field of Search .......................................... 340/3, 3
FM, 3 A, 3 D, 3 C, 5 E, 1; 343/17.2, 17.5, 5 CD

[56] References Cited
UNITED STATES PATENTS

| 2,428,351 | 10/1947 | Ayres | 340/3 C |
| 2,822,536 | 2/1958 | Sandretto | 343/17.2 |
| 3,121,856 | 2/1964 | Finney | 340/3 |
| 3,156,110 | 11/1964 | Clynes | 73/67.8 |
| 3,175,214 | 3/1965 | Ramsay et al. | 343/17.2 X |
| 3,307,142 | 2/1967 | Doebler | 340/3 |
| 3,311,914 | 3/1967 | Barringer | 343/17.2 |
| 3,466,652 | 9/1969 | Heyser | 343/17.5 X |

Primary Examiner—Richard A. Farley
Attorney—Schmidt, Johnson, Hovey & Williams

ABSTRACT: In a radar or sonar system, a continuous spectrum of electromagnetic or compressional wave energy is transmitted and defines a wide band of frequencies. The receiver has one or more channels, the multiple channel arrangement defining subbands of the transmitted frequency band which are separately detected so that an identification signal is derived from each channel respectively. Each identification signal represents the response of the target to that particular frequency subband, such signals being combined as desired to provide a suitable readout. For three information signal output logic, a color cathode-ray tube provides an effective display by controlling each color input thereof in accordance with a corresponding one of the identification signals.

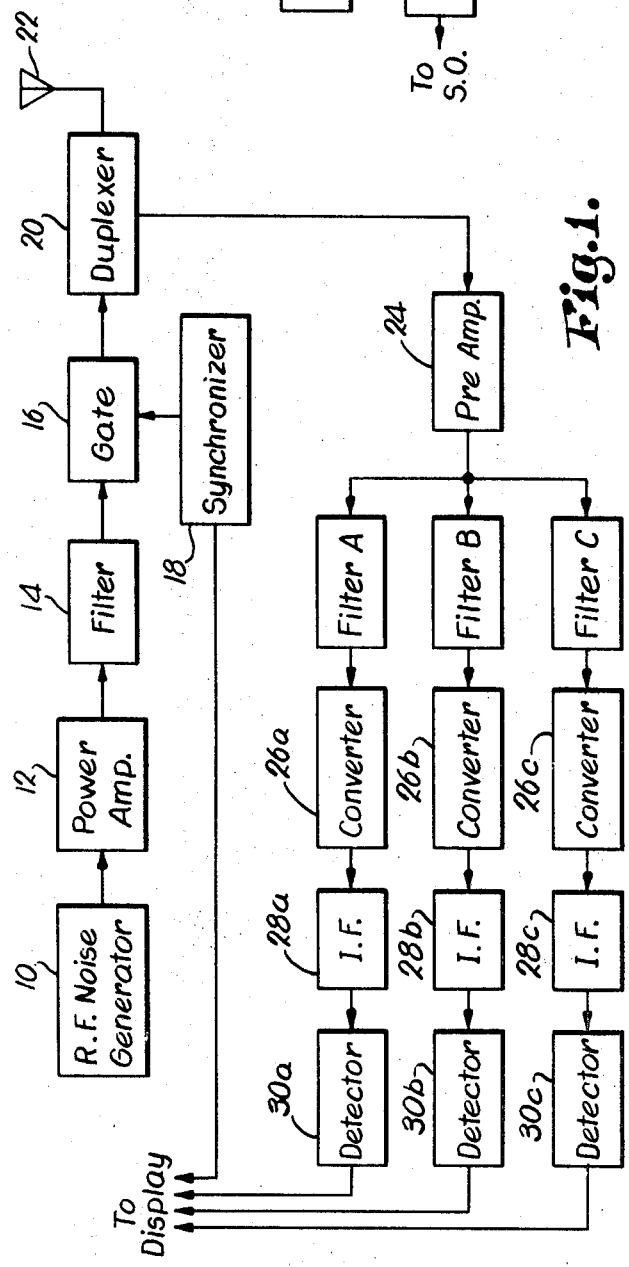

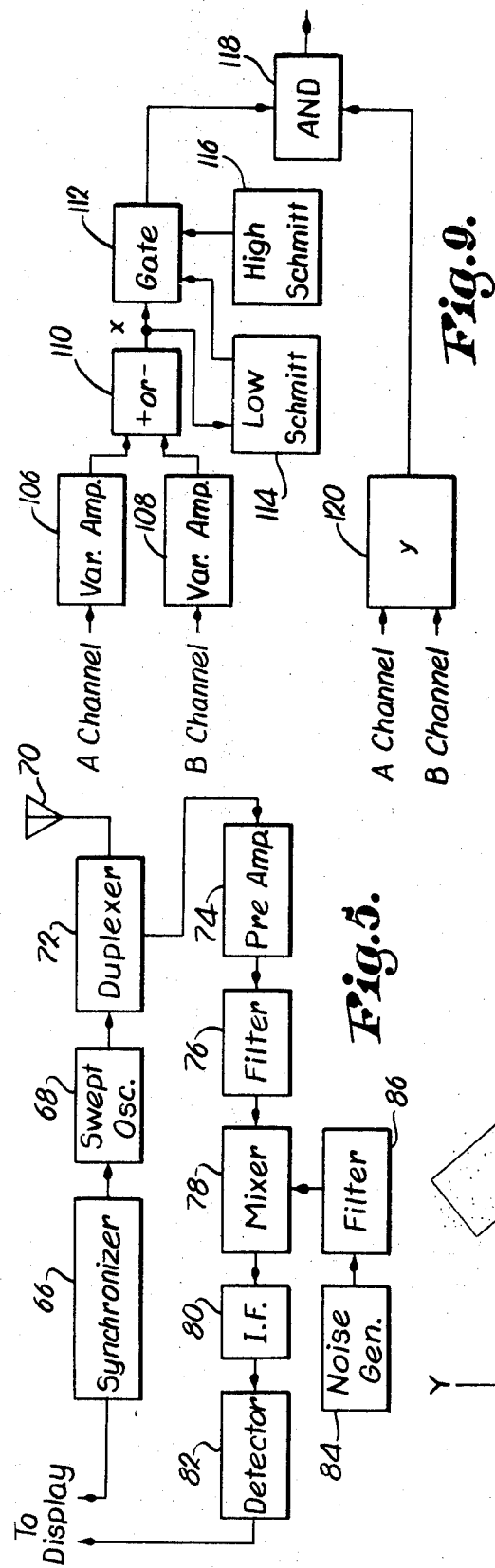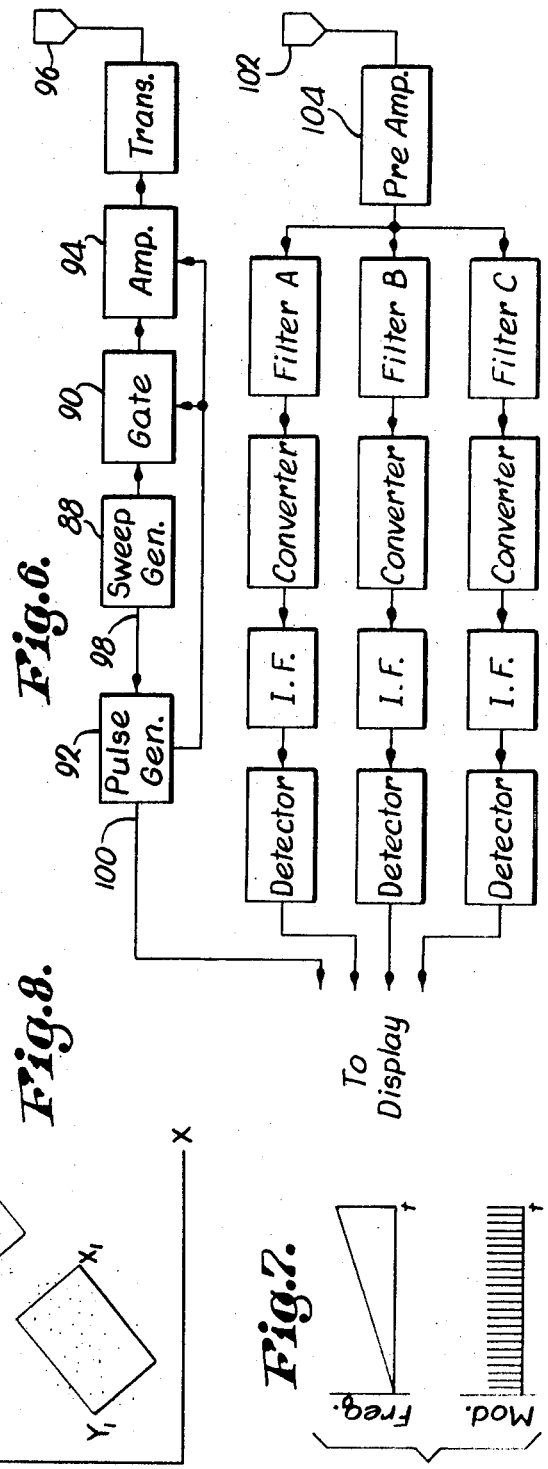

POLY-PANCHROMATIC TARGET IDENTIFICATION

Radar and sonar systems known and utilized heretofore operate at a single frequency or perhaps a collection of single frequencies, with only modest frequency spread caused by pulse modulation. Some radar systems use "frequency agility" for various reasons, but this again is ordinarily within a very small frequency range. As a result, the detection of target resonances by normal radar and sonar systems is purely coincidental. Objects having resonances within the band occupied by the transmitted signal will have scattering amplitudes much larger than for frequencies off their particular resonances. But even in radar techniques utilizing multiple discrete frequency transmission, the probability of detecting such resonance effects still remains quite low.

This is in direct contrast to the optical phenomenon that is exhibited when objects are viewed under white light. In the optical range the human eye identifies objects as having different colors because the varied materials, when illuminated with white light, absorb different wavelengths an scatter the others. A panchromatic black and white film is more or less sensitive to light scattered at any wavelength within its range of sensitivity. Thus, even though absorption by molecular or atomic resonances within this sensitive wavelength region removes some energy, an image is registered. However, illumination with a monochromatic light source provides a different image because some of the materials illuminated scatter the particular illuminating wavelength well while other materials act primarily as absorbers. Also, because of phase interference (multipath phenomena), monochromatic light photographs have a speckled appearance which renders it difficult to identify the object or objects photographed. The same speckled appearance is observed with discrete frequency radar photographs and objects are likewise difficult to identify.

It is, therefore, the primary object of the present invention to provide a method and apparatus for effectively duplicating the white light optical phenomenon in the identification of targets interrogated by radar and sonar, in order to enhance target identification through the observation of resonances existing at a particular frequency or frequencies (for a target of a given type) within a wide frequency spectrum.

As a corollary to the foregoing object, it is an important aim of this invention to effectively extend color vision to radar and sonar systems through the use of a wide transmitting frequency band as aforesaid wherein primary colors are assigned to responses within subbands, thereby utilizing color to distinguish between objects having the same radar or sonar return amplitude in the same manner as color distinguishes between objects of equal brightness illuminated by white light.

Furthermore, it is an important object of this invention to provide a method and apparatus whereby the "signature" of particular objects may be identified by the response thereof within each of a plurality of relatively wide spectral portions of wave energy incident thereupon. In the drawings:

FIG. 1 is a block diagram of one embodiment of a radar system employing a noise modulated transmitter and three subband receiver channels;

FIG. 2 is a block diagram of a second embodiment of a radar system employing a swept oscillator in the transmitter thereof;

FIG. 3 is a block diagram illustrating the synchronizer in the system of FIG. 2 in detail;

FIG. 4 illustrates waveforms associated with the block diagram of FIG. 3;

FIG. 5 is a third embodiment of a radar system utilizing a swept oscillator in the transmitter and noise modulation in the receiver;

FIG. 6 is a block diagram of a sonar system wherein a wide transmitted band width is obtained by a gated, slow sweep;

FIG. 7 is an illustration of waveforms relating to the transmitter section of the sonar system of FIG. 6;

FIG. 8 is an exemplary two-dimensional scatter plot illustrating the use of automatic recognition techniques with the present invention; and FIG. 9 is a block diagram of apparatus utilized to define the boundary rectangle shown in FIG. 8.

By way of introduction, the radar and sonar systems to be fully described hereinafter operate over an extremely wide band to detect the enhanced echo associated with any target having a resonance within the band. As with visible light, objects having different "colors" (different responses to the incident wave energy) appear at different wavelengths in the band. An object resonant anywhere within the band, however, appears stronger to the wide band radar or sonar than would be the case for a single frequency system operating at any wavelength other than that of the target resonance. Furthermore, the wide band system provides averages over the frequency-independent scattering pattern of a complex object analogous to viewing the target from a variety of aspect angles.

The wide band radar and sonar systems of the present invention, due to the optical analogy discussed hereinabove, will be referred to as "panchromatic" since the exciting energy covers a continuous spectrum of frequencies in the same manner as white light. Systems will also be described hereinafter in which a plurality of receiving channels are utilized to divide the reflected wave energy into desired subbands, the target response within each subband being determined. Such multiple channel systems will be referred to as "polypanchromatic", the light analogy being the primary color emulsions on color film or the color guns associated with color cathode ray tubes.

It will be further pointed out in the detailed description that, if desired, a color cathode-ray tube may be utilized to display the information derived by the various embodiments of the invention utilizing three or more separate receiving channels to excite the respective color guns of the tube. However, the use of a color display should not be confused with the actual color of a particular target since there is no relationship between the target color as viewed under white light and the "radar color" or "sonar color" which will identify the object after incidence of radar or acoustical energy therewith. The light analogy previously discussed, however, is helpful in understanding the concepts of the present invention, as long as any confusion with color as registered by the human eye in viewing an object is avoided. In this respect, it is helpful to understand that, in the optical region, resonant absorption plays the primary role in the determination of color. In the microwave (radar) region, however, resonant scatter is the dominant effect. That is, in the optical region energy is selectively removed from the white light by quantum resonances, whereas in the microwave region resonance produces large directive gains in the reradiated field pattern which in turn produce stronger images or echoes It may be appreciated that detection of such directive gains enhances the target-signal to clutter ratio and provides a means of determining the spectral signatures of objects unobtainable in discrete frequency radar and sonar.

Referring to FIG. 1, one embodiment of a wide band radar system employing the teachings of the present invention is illustrated in block diagram form. A radio frequency noise generator 10 of the required bandwidth drives a broad band power amplifier 12 having an output that is coupled by a bandpass filter 14 to one input of a gate 16. The filter 14 restricts the output of amplifier 12 to the desired transmitting bandwidth, the gate 16 being operated by a synchronizer 18 to permit passage of RF energy to a duplexer 20 which, in turn, feeds a suitable antenna 22. Thus, the transmitter is a broad band pulse radar, the synchronizer 18 comprising a clock which delivers a pulse train to the gate 16 at the desired repetition frequency of the transmitted RF pulses.

In the receiver, the duplexer 20 feeds received signals to a broad band preamplifier 24 which has its output coupled to the inputs of three band-pass filters A, B and C. The passband of each filter is a subband of the transmitted frequency band, the receiver thus being divided into three separate channels by the filters A, b and C. Each channel handles the respective subband in the usual superheterodyne manner, the output of filter A being connected to a converter 26a which, in turn, drives a broad band intermediate frequency amplifier 28a having its output coupled to a detector 30a. Corresponding superheterodyne components of the other channels are designated by the same reference numerals with the addition of the "b" or "c" notation. Each converter comprises a local oscillator and a mixer, the local oscillator having a frequency and bandwidth adapted to the particular receiver subband.

As illustrated schematically in FIG. 1, the outputs of the three detectors 30a, 30b and 30c extend to a display, together with an output connection of the synchronizer 18. The system of FIG. 1 is poly-panchromatic by virtue of the employment of subbands in the receiver within which separate detection is effected. Therefore, having three separate, detected signals at the receiver outputs, a color cathode ray tube having three color guns is a particularly useful form of display, each detector output being connected to a corresponding color input. Therefore, the output signal from detector 30a could control the red gun, the output signal from detector 30b could control the green gun, and the output signal from detector 30c could control the operation of the blue color gun. The synchronizer output to the display would be connected to the appropriate sweep circuits associated with the cathode ray tube in order to control the azimuth sweep, for example, in accordance with the position of the antenna 22 in systems utilizing an angularly swept antenna. The synchronizer 18 would also initiate deflection circuitry governing the range sweep, as in conventional radar systems. These various functions, together with range sweep delay to eliminate closein clutter and the necessary blanking of the CRT beams during the retrace time, are well known in the radar art and hence specific circuitry for their execution is not disclosed herein.

In FIG. 2 a second embodiment of a radar system is illustrated and is of the panchromatic type, it being understood that additional receiving channels could be added to provide a poly-panchromatic system. A synchronizer 32 has one output thereof connected to a swept RF oscillator 34 which, in turn, drives a traveling wave tube amplifier 36. The amplifier output is connected to an antenna 38 through a duplexer 40. As will be discussed fully hereinafter, a wide transmitted bandwidth is obtained by sweeping the oscillator 34 from one limit of the band to the other, the sweeping operation being initiated by a control pulse from the synchronizer 32.

The receiver of the system of FIG. 2 utilizes a swept local oscillator 42 which is also controlled by the synchronizer 32, the sweep of the local oscillator 42 being offset from the sweep of the oscillator 34 in the transmitter by the amount of the IF frequency. The receive input from the duplexer 40 is amplified by a preamplifier 44, fed to a band-pass filter 46, and then introduced into a mixer 48 which also receives the output of the local oscillator 42. The IF output signal from the mixer 48 is delivered to an IF amplifier 50, band compression being provided in this embodiment since the IF amplifier 50 may have a considerably narrower bandwidth than the reception bandwidth due to the utilization of the swept local oscillator 42, as will become clear hereinafter. A detector 52 is coupled to the IF output, and the detected signal is fed to an appropriate display after integration thereof by the integrator 54.

The synchronizer 32 of the FIG. 2 system is shown in greater detail in FIG. 3. A clock or timing oscillator 56 feeds a sinusoidal wave to shaping circuitry 58, the clock 56 operating at a rate that produces pulses at the shaper output separated by the time duration of the transmitted pulse width. The shaper output pulses are counted down by a decade or binary counter 60 to provide a much lower frequency pulse repetition rate the spacing between the lower frequency pulses being dependent upon the transmitted pulse length and the range of the radar. The output of the counter 60 drives a ramp generator 62 which, in turn, provides a triangular control pulse that is fed to the swept oscillator 34. A sawtooth generator 64 is driven directly by the output of the shaper 58 and provides a sawtooth wave form at its output which is fed to the swept local oscillator 42 in the receiver. The various waveforms at the outputs of the above described components of the synchronizer 32 are illustrated in FIG. 4 and are designated by reference numerals corresponding to such components.

The embodiment of FIG. 5 is also illustrated in panchromatic form and employs a synchronizer 66 which controls a swept RF oscillator 68 coupled to an antenna 70 through a duplexer 72. Received signals from the duplexer 72 are delivered to a preamplifier 74, a band-pass filter 76, and a mixer 78, and then at the intermediate frequency are amplified by an IF amplifier 80 and detected by a detector 82. In the receiver of the FIG. 5 system, band compression is also obtained as in the FIG. 2 embodiment but in a different manner. An RF noise generator 84 serves as a local oscillator and, through a bandpass filter 86, delivers its output to the mixer 78 where such output is heterodyned with the incoming received signals. The bandwidth of the noise generator 84 (defined by the passband of the filter 86) extends beyond that of the receiving channel by the IF bandwidth at both limits.

The apparatus illustrated in FIG. 6 is an exemplary sonar system utilizing the principles of the present invention. A sweep frequency generator 88 delivers its output signal to a gate 90 which is controlled by a pulse generator 92. A gated wide band power amplifier 94 receives the output from the gate 90 and is also under the control of the pulse generator 92. The amplifier output is delivered to a step-up pulse transformer which, in turn, drives a transmitting transducer 96. The transmitter operates in a slow sweep mode, the transmitted frequency being swept from minimum to maximum in a fixed time while the gate 90 and gated amplifier 94 are placed in intermittent operation by the pulse generator 92 at a repetition rate from 10 to 1,000 times faster than the sweep rate. Therefore, the transmitter output consists of a pulse train in which each pulses has a different frequency content, the pulse spacing being such that the spectrum of each pulse overlaps the spectra of neighboring pulses. This is illustrated in FIG. 7 where the first graph of frequency versus time represents the sweep of the output signal from the generator 88, and the second graph of modulation versus time represents the output pulses from the pulse generator 92 that are applied to the gate 90 and the gated amplifier 94.

In addition to the swept output signal, the sweep generator 88 also provides a blanking pulse at a second output 98 coupled with the pulse generator 92, such blanking pulse being utilized to gate off the pulse generator 92 during the retrace interval of the sweep frequency generator 88. Furthermore, the pulse generator 92 has a synchronizing output 100 at which delayed pulses at the transmitted pulse repetition frequency are delivered and applied to the display equipment, the delay being for the purpose of avoiding closein response as discussed with respect to the synchronizer 18 utilized in the radar system of FIG. 1.

The receiving section of the sonar system of FIG. 6 is illustrated in poly-panchromatic form and includes a receiving transducer 102 which fees a preamplifier 104, the output thereof being divided into three subbands by band-pass filters A, B and C. Except for the range of frequencies covered by the transmitted pulses, and hence the subband frequencies, the receiving section in the sonar system is identical to that as discussed hereinabove with respect to the poly-panchromatic radar system of FIG. 1.

In order to illustrate the adaptability of automatic recognition techniques to the present invention, the two-dimensional scatter plot of FIG. 8 contains two prominent groupings of data points enclosed by the rectangles as shown. Each data point is a plot of simultaneously received output pulse pairs derived from a pair of channels in the receiving section of the radar or sonar apparatus, as illustrated in FIG. 9 where a pair of variable gain amplifiers 106 and 108 have their inputs connected to the detector outputs of two channels of the receiver section which are referred to as the A and B channels respectively. For example, the inputs of the amplifiers 106 and 108 could be connected to the outputs of the detectors 30a and 30b in the system of FIG. 1, modified by elimination of the third channel.

The apparatus shown in FIG. 9 comprises exemplary automatic recognition circuitry responsive to the channels A and B. The outputs of the amplifiers 106 and 108 are fed to either an adder or a subtractor 110, the sum or difference signal therefrom being fed to a gate 112. Such sum or difference signal is the abscissa of a data point plotted with respect to a pair of rotated axes $X_1$ and $Y_1$ (FIG. 8), the direction of rotation being dependent upon whether vector addition or vector subtraction of the outputs of the amplifiers 106 and 108 is effected. Rotation of the axes is achieved so that there will be a greater difference in the coordinate values of the two data point groupings. A low level Schmitt trigger 114 and a high level Schmitt trigger 116 set the lower and upper limits respectively of the abscissa; therefore, only those $x$ values between the limits set by the triggers 114 and 116 will be permitted to pass through the gate 112 to an AND gate 118 which also receives similarly limited $y$ values obtained from circuitry denoted by the block 120. The $y$ circuitry 120 is identical to the $x$ circuitry just described, with the exception that the two variable gain amplifiers of the $y$ circuitry 120 would be set at different levels in accordance with the relocated axes $X_1$ and $Y_1$.

Thus, to simply and automatically recognize a data point within either of the groups illustrated in FIG. 8, the boundaries of the group selected for recognition are defined by a rectangle as shown. The variable gain amplifiers in the $x$ and $y$ sections of the apparatus of FIG. 9 are adjusted accordance with the defined boundary rectangle, the adder or subtractor and amplifier circuits then performing a linear combination of the input signals from the A and B channels which serves to rotate the original axes to $X_1$ and $Y_1$. The coordinate reference is now with respect to the $X_1$ and $Y_1$ axes, and the Schmitt trigger arrangement controls the gate 112 and the gate in the $y$ circuitry 120 such that only those signal components which fall within the limits of the Schmitt triggers are passed to the AND gate 118. The final AND output, therefore, consists only of those signals from the A and B channels which selected boundary rectangle.

OPERATION

In the poly-panchromatic system of FIG. 1, a wide band of frequencies is covered by the noise generator 10, the spectrum within the transmitted band being continuous. The width of the transmitted band and its location in the electromagnetic spectrum will, of course, depend upon the target resonances of interest. Resonance of many targets of interest will likely be found in the frequency range of from 500 MHz. to 18 GHz. A ratio of the frequency of the upper band limit to the frequency of the lower limit of two to one is readily obtainable. If a wider range is desirable, multiple transmitting systems may be utilized in the embodiment of FIG. 1 and in the other embodiments of the invention to be subsequently discussed.

The receiver of the FIG. 1 system is a three channel poly-panchromatic arrangement with the filters A, B and C dividing the reception band into three subbands which may be adjacent to one another and thus continuous throughout the full reception bandwidth. On the other hand, in some instances it may be desired to separate the subbands, particularly in multiple transmitter systems as mentioned above where each transmitter system may be selected to operate over a transmitting band of continuous frequencies that is isolated from the respective bands of the other transmitter sections. Ultimate determination in this respect, of course, depends upon the frequencies of the target resonances of particular interest in a given application.

An advantage of the embodiment of FIG. 1 is that the target is simultaneously illuminated with all components of the transmitted frequency spectrum integration of the response of the target over each subband being effected by the simultaneous reception and hence simultaneous detection of all frequencies present. Thus, a summation of all of the responses within a given subband appears at the respective detector output. However, the bandwidths of the IF amplifiers 28a, 28b and 28c must be as broad as that of the corresponding filters A, B and C that divide the overall bandwidth into the subbands.

In the embodiment of FIGS. 2–4 the transmitted bandwidth is obtained by sweeping. The output of the shaper 58 is a pulse train wherein each pair of adjacent pulses is separated by a time $t$ which corresponds to a range increment (the distance in space occupied by the transmitted pulse). The countdown action of the counter 60 determines the range of the system and triggers the ramp generator 62 to, in turn, actuate the swept oscillator 34 to sweep the output thereof through the frequency range of the transmitted bandwidth. The time duration between the commencement of one output pulse from the ramp generator 62 and a subsequent output pulse is represented in FIG. 4 by the time period $T$ determined by the countdown ratio of the counter 60.

Since the sawtooth generator 64 is controlled directly by the shaper output, it is evident that the local oscillator 42 is swept over the full receiving bandwidth during each range increment, this sweep being repeated for as many range increments as the maximum range and resolution of the system dictate, as illustrated by the sawtooth wave form of the generator 64 seen in FIG. 4. Therefore, the frequency sweeping system of FIG. 2 has the attribute of providing band compression such that the IF bandwidth may be substantially narrower than the reception bandwidth.

The integrator 54 on the output of the detector 52 is provided in the FIG. 2 system since, with the sweeping approach, integration is not automatically achieved as in FIG. 1 where simultaneous reception is present. The integrator 54 integrates the detector output over the period of the local oscillator sweep in order that the identification signal delivered to the display will represent a summation of the response of the target over the reception bandwidth. Alternatively, when utilizing a cathode-ray tube display, the integration may be effected by the persistence of the phosphor dots on the tube screen, thereby eliminating the need for separate integrating circuitry.

In the embodiment of FIG. 5 the sweeping of the RF oscillator 68 is effected in the same manner as in the embodiment of FIGS. 2–4. However, the noise generator 84 in the receiver serves as a noise modulated local oscillator and thus the necessity of providing a swept local oscillator is obviated.

Besides the illustrated embodiments, standard frequency modulated radar techniques may also be adapted to the present invention. In the transmitter, a greater modulation swing would be employed to accommodate the wide transmitting band, and multiple transmitter sections could be utilized if necessary or desired in order to cover the frequency spectrum of interest.

In the embodiment of FIG. 6 which illustrates the adaptation of the teachings of the present invention to sonar, a slow sweep of the sweep frequency generator 88 is effected in contrast to the rapid sweep of the two previous embodiments. The pulse generator 92 delivers a train of pulses to the gate 90 and the gated amplifier 94 during the time that the generator 88 is sweeping through its frequency range. This is illustrated in FIG. 7 where it may be seen that the modulation imparted by the pulse generator 92 will effectively break the generator output into a series of relatively short duration pulses having overlapping spectra. At the termination of the sweep, the generator 88 delivers a blanking pulse to the pulse generator 92 to terminate operation thereof during the retrace interval of the sweep generator 88. After retracing, the blanking pulse is removed and the sweep generator 88 and the pulse generator 92 resume operation as before. In a typical operation the sweep might traverse from 4 kHz. to 12 kHz. in approximately one second, although the duration of the sweep may be shorter or substantially longer depending upon the particular application. Manifestly, target identification information from the receiver is being displayed or stored between transmitted pulses as in the previous embodiments, the difference being that successive transmitted pulses during a given sweep have different frequency contents. Nonetheless, wide band, continuous spectrum target interrogation is achieved by virtue of the overlapping spectra of the successive transmitted pluses.

From the foregoing, it may be appreciated that the present invention teaches a method of identifying a target which is subjected to wave energy of either the electromagnetic or compressional type. A continuum of the wave energy is transmitted over a wide band of frequencies and is subsequently received after incidence with the target. An identification signal is then derived from the received wave energy which represents the response of the target to the band of frequencies. This method may be described as panchromatic in that a single identification signal (from a detector or integrator output) is obtained representing the target response.

The poly-panchromatic method, therefore, requires the transmission of a plurality of continua of the wave energy over a corresponding plurality of wide bands of frequencies. A plurality of identification signals are now derived which represent the response of the target to respective bands of frequencies. In terms of apparatus, such plurality of continua may be transmitted by a single wide band transmitter section in the radar or sonar system, with separate detection within each band being effected in the receiver section through the use of band-pass filters at the receiver input to divide the transmitted band into reception subbands or channels. The identification signals so obtained may be fed to an appropriate display such as a color cathode-ray tube, or automatic recognition techniques or computer storage may be utilized in handling the data. It should be understood that, although three channel poly-panchromatic systems are illustrated herein, it is not to be interpreted that such systems are limited to three channels only, since as many channels may be utilized as is desired to effect appropriate division of the incoming signals into response subbands. In this respect, combining and logic circuits may be employed with multiple channel arrangements to reduce the number of identification signals to a lesser number prior to actual display or use thereof in the identification of targets.

Having thus described the invention, What is claimed as new and desired to be secured by Letters Patent is:

1. A method of identifying a target subjected to wave energy comprising the steps of:
    transmitting wave energy within a spectrum including a plurality of different, individually wide and continuous bands of frequencies;
    receiving said transmitted wave energy throughout each of said wide bands of frequencies after incidence thereof with said target; and
    deriving a plurality of identification signals from said received wave energy respectively representing the response of the target to said wave energy throughout each of said wide bands of frequencies.

2. The method as claimed in claim 1, wherein said bands of frequencies are so related to each other that said spectrum for which said wave energy is transmitted is continuous and uninterrupted.

3. The method as claimed in claim 1, wherein said step of deriving said identification signals includes integrating the received wave energy for each said bands of frequencies to provide a separate identification signal for each of said wide bands of frequency.

4. The method as claimed in claim 1, wherein is provided the additional step of combining representations of each of said identification signals to present a composite display thereof.

5. Apparatus for subjecting a target to wave energy to identify the target, said apparatus comprising:
    means for transmitting wave energy within a spectrum including a plurality of different, individually wide and continuous bands of frequencies;
    means for receiving said transmitted wave energy throughout each of said wide bands of frequencies after incidence thereof with said target,
    said receiving means having a plurality of wide band channels defining wide subbands respectively corresponding to said bands of frequencies; and
    detector means coupled with said receiver and separately responsive to the received wave energy in each of the individual channels of said receiving means for deriving a corresponding plurality of separate identification signals respectively representing the response of the target to said wave energy throughout each of said wide subbands of frequencies.

6. Apparatus as claimed in claim 5,
    said channels being at least three in number; and
    a color cathode-ray tube having three color inputs coupled with said detector means and responsive to each of said identification signals.

7. 7. Apparatus as claimed in claim 5, said transmitting means including a high frequency noise generator having a frequency content covering said spectrum, and gating means coupled with the output of said generator for delivering time spaced pulses of said content.

8. Apparatus as claimed in claim 5,
    said transmitting means including a swept high frequency generator having a range of sweep covering said spectrum,
    said receiving means including a swept local oscillator offset from said range of sweep by a predetermined difference frequency, a mixer for receiving said received wave energy and operably coupled with the output of said local oscillator, an means for delivering difference frequency output signals from said mixer to said detector means.

9. Apparatus as claimed in claim 5,
    said transmitting means including a swept high frequency generator having a range of sweep covering said spectrum
    said receiving means including a high frequency noise generator, a mixer for receiving said received wave energy and operably coupled with the output of said noise generator, and means for delivering output signals of a predetermined difference frequency from said mixer to said detector means.

10 Apparatus as claimed in claim 5, said transmitting means including a swept high frequency generator having a relatively slow rate of sweep covering said spectrum, and gating means coupled with the output of said generator for delivering time spaced pulses therefrom during each sweep having overlapping spectra.